W. B. Barnard,
Tackle Block,
№ 22,154.     Patented Nov. 30, 1858.

UNITED STATES PATENT OFFICE.

WM. B. BARNARD, OF WATERBURY, CONNECTICUT.

TACKLE-BLOCK.

Specification of Letters Patent No. 22,154, dated November 30, 1858.

*To all whom it may concern:*

Be it known that I, W. B. BARNARD, of Waterbury, in the county of New Haven and State of Connecticut, have invented a new and useful Improvement in Tackle-Blocks; and I do hereby declare that the following is a full, clear, and exact description of the same, reference being had to the annexed drawings, making a part of this specification, in which—

Figure 1:
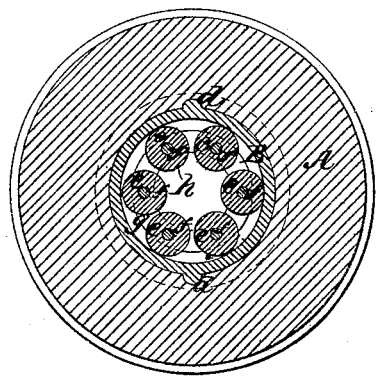
Figure 2:
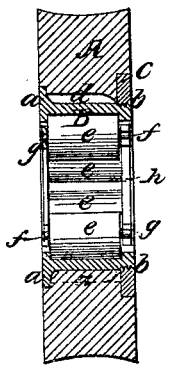

Figures 1 and 2, are vertical sections of the pulley of a tackle block, the two planes of section crossing each other at right angles, one bisecting the axis longitudinally and the other transversely.

Similar letters of reference indicate corresponding parts in the two figures.

To enable those skilled in the art to fully understand and construct my invention I will proceed to describe it.

A, pulley which is turned out of hard wood as usual. This pulley has a circular opening made through its center to receive a hollow metal cylinder or bushing B, which has a flanch $a$, projecting at right angles from one end see Fig. 2, the opposite end of the bushing has a screw thread B, formed on it to receive an annular nut $c$.

The cylinder or bushing B, has a lug or a projection $d$, on its periphery at opposite sides of its center. These lugs or projections extend the whole length of the cylinder or bushing with the exception of that part occupied by the screw $b$, and flanch $a$.

In the sides of the opening that receives the cylinder or bushing B, recesses are made to receive the lugs $d$, and in the sides of the pulley concentric with the opening that receives the bushing and adjoining said opening, recesses are made to receive the flanch $a$, and the nut $c$, so that the outer surfaces of the flanch and nut will be flush with the sides of the pulley.

Within the cylinder or bushing B, a series of rollers $e$, are placed, said rollers being fitted on axis $f$, the ends of which are secured in rings $g$. The outer part of the rollers $e$, bear against the inner surface of the cylinder of bushing and the axis of the pulley passes through the central space $h$, formed by the rollers, the latter being the bearing of the axis.

From the above description it will be seen that by screwing up the nut $c$, the bushing B, will be firmly secured in the pulley and it will also be seen that the lugs $d$, $d$, will effectually prevent the bushing from turning within the opening. The bushing therefore will be permanently secured in the pulley without the aid of rivets or bolts, which has hitherto been the usual means employed for effecting the purpose. The rivets or bolts hitherto used were driven through holes in the flanches at right angles into the pulley thereby weakening it to a great degree rendering it very liable to split. My invention completely obviates this difficulty.

I do not claim inventing a bushing, provided with friction rollers, in a pulley or tackle block for the purpose of diminishing friction, for such device has been previously used.

Having thus described my invention, I claim and desire to secure by Letters-Patent, as an improved article of manufacture—

A tackle block having its bushing B secured and adjusted to the pulley A, by means of a nut ($c$) as herein shown and described.

WM. B. BARNARD.

Witnesses:
CALVIN H. CARTER,
JAMES SCARRITT,